United States Patent
Park et al.

(10) Patent No.: US 8,677,099 B2
(45) Date of Patent: Mar. 18, 2014

(54) RECONFIGURABLE PROCESSOR WITH PREDICATE SIGNAL ACTIVATED OPERATION CONFIGURATION MEMORY AND SEPARATE ROUTING CONFIGURATION MEMORY

(75) Inventors: Il-hyun Park, Yongin-si (KR); Soo-jung Ryu, Cheonan-si (KR); Dong-hoon Yoo, Seoul (KR); Yeon-gon Cho, Hwaseong-si (KR); Bernhard Egger, Seoul (KR); Woong Seo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 12/563,350

(22) Filed: Sep. 21, 2009

(65) Prior Publication Data

US 2010/0174885 A1 Jul. 8, 2010

(30) Foreign Application Priority Data

Jan. 8, 2009 (KR) ........................ 10-2009-0001585

(51) Int. Cl.
*G06F 9/30* (2006.01)
(52) U.S. Cl.
USPC ................................ 712/15; 710/316; 712/37

(58) Field of Classification Search
None
See application file for complete search history.

(56) References Cited

U.S. PATENT DOCUMENTS

| 5,185,706 | A  | * | 2/1993 | Agrawal et al. ................. 326/39 |
| 7,064,579 | B2 | * | 6/2006 | Madurawe ...................... 326/39 |
| 7,269,719 | B2 |   | 9/2007 | Colavin et al. |
| 7,287,152 | B2 |   | 10/2007 | Wilson |
| 7,302,557 | B1 |   | 11/2007 | Hwu et al. |
| 2008/0034235 | A1 |   | 2/2008 | Houshaku |

FOREIGN PATENT DOCUMENTS

| KR | 10-2007-0085746 | 8/2007 |
| KR | 1020080083417 | 9/2008 |

\* cited by examiner

*Primary Examiner* — Kenneth Kim
(74) *Attorney, Agent, or Firm* — NSIP Law

(57) ABSTRACT

Provided are a reconfigurable processor and operating method thereof. The reconfigurable processor may use a configuration memory distributed to each operation unit. The distributed configuration memory may be separated into a distributed operation configuration memory including configuration information about an operation of a function unit, and a distributed routing configuration memory including configuration information about routing. The distributed operation configuration memory may be activated according to a predicate signal.

11 Claims, 6 Drawing Sheets

RECONFIGURABLE PROCESSOR WITH PREDICATE SIGNAL ACTIVATED OPERATION CONFIGURATION MEMORY AND SEPARATE ROUTING CONFIGURATION MEMORY

CROSS-REFERENCE TO RELATED APPLICATION

This application claims the benefit under 35 U.S.C. §119 (a) of a Korean Patent Application No. 10-2009-0001585, filed Jan. 8, 2009, the disclosure of which is incorporated herein in its entirety by reference for all purposes.

BACKGROUND

1. Field

The following description relates to a reconfigurable processor and operating method thereof, and more particularly, to a structure of a coarse grained array (CGA).

2. Description of the Related Art

An apparatus with a reconfigurable architecture includes a circuit designed and manufactured to perform a specific function, but can be changed later according to a user's preference. For example, a reconfigurable processor used in a system or terminal to operate in one mode, for example, a standard communication mode or a multimedia mode, may be configured to be a combination of a host processor, such as a very long instruction word (VLIW) processor, and a CGA.

SUMMARY

In one general aspect, there is provided a reconfigurable processor, including a function unit to perform an operation, a storage unit to store a result of the operation, a distributed operation configuration memory to store configuration information about the operation of the function unit and a distributed routing configuration memory to store configuration information about routing, wherein a predicate signal input to the function unit is applied to the distributed operation configuration memory and controls activation of the distributed operation configuration memory.

The distributed operation configuration memory may include execution instruction information of the function unit, source operand information, and information about a destination receiving the result of the operation, and the distributed routing configuration memory may include multiplexer (MUX) selection information used to perform routing.

The reconfigurable processor may include a register to synchronize a first input, which is configuration information read from the distributed operation configuration memory according to the predicate signal and input to the function unit, with a second input, which is the predicate signal input to the function unit A signal selecting a coarse grained array (CGA) mode may be used as a chip selection signal to switch the distributed routing configuration memory.

The predicate signal may indicate whether the result of the operation performed by the function unit will be stored in the storage unit.

The storage unit may be a register file present in each function unit, and the predicate signal may be a signal to indicate whether the result of the operation should be stored in the register file.

In another general aspect, there is provided an operating method of a reconfigurable processor including a function unit to perform an operation function, a storage unit to store a result of the operation, a distributed operation configuration memory to store configuration information about the operation of the function unit and a distributed routing configuration memory to store configuration information about routing, the operating method including receiving a predicate signal and controlling activation of the distributed operation configuration memory based on a value of the predicate signal.

The distributed operation configuration memory may include execution instruction information of the function unit, source operand information, information about a destination receiving the result of the operation, and the distributed routing configuration memory may include multiplexer (MUX) selection information used to perform routing.

The controlling of the activation of the distributed operation configuration memory may include, in response to the predicate signal having a first value directing the storage unit to store the result of the operation performed by the function unit, activating the distributed operation configuration memory at a clock cycle at which the predicate signal arrives at the function unit; and in response to the predicate signal not having the first value, deactivating the distributed operation configuration memory at the clock cycle at which the predicate signal arrives at the function unit.

The operating method may further include inputting a signal selecting a coarse grained array (CGA) mode as a chip selection signal to switch the distributed routing configuration memory so that the distributed routing configuration memory continues to operate regardless of the predicate signal.

The predicate signal may indicate whether the result of the operation performed by the function unit will be stored in the storage unit.

The storage unit may be a register file present in each function unit, and the predicate signal may be a signal indicating whether the result of the operation should be stored in the register file.

Other features and aspects will be apparent from the following detailed description, the drawings, and the claims.

Figure 1:
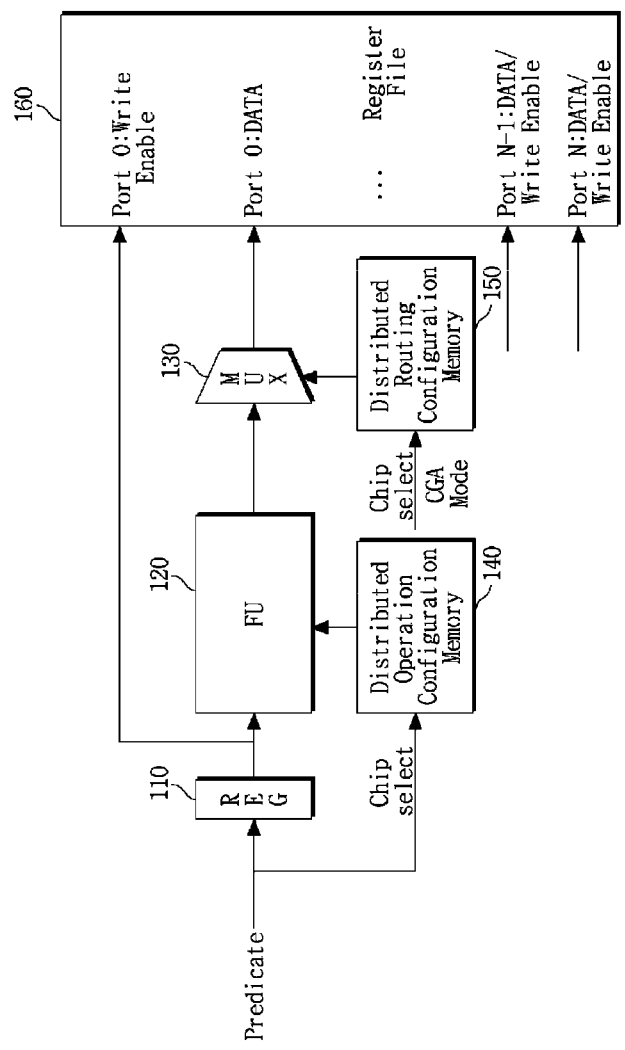
FIG. 1 is a block diagram illustrating an exemplary processing unit included in a reconfigurable processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary processing unit included in a reconfigurable processor.

A coarse grained array (CGA) processes a task generally involving repeated performance, such as a loop task, which is repeatedly performed, and processing of a large amount of data according to a control of a very long instruction word (VLIW) core and the like. In general, the CGA includes a plurality of processing units, and each of the processing units includes a function unit and a register file. FIG. 1 illustrates an example of a processing unit included in a CGA.

Referring to FIG. 1, the exemplary processing unit includes a register (REG) 110, a function unit (FU) 120, a multiplexer (MUX) 130, a distributed operation configuration memory 140, a distributed routing configuration memory 150, and a register file 160. The FU 120 receives configuration information from the distributed operation configuration memory 140, and the MUX 130 receives configuration information from the distributed routing configuration memory 150.

The FU 120 performs an operation function. The FU 120 may operate based on configuration information stored in a configuration memory, which, as illustrated in FIG. 1, may be divided into the distributed operation configuration memory 140 and the distributed routing configuration memory 150.

A plurality of FUs included in a CGA may operate using configuration information read line-by-line from one unified configuration memory.

The configuration information may include, for example, information about which operation is performed by the FUs included in the CGA, in which processing unit's register file data corresponding to the FUs used to perform the operation is stored, and whether a value resulting from the operation is stored in a register file or an external memory. The configuration information stored in the configuration memory may be classified into information directly used by the FUs, information used as a coefficient of an operation by FUs, information required to perform routing, and other information. Thus, even where the FUs do not use configuration information, a configuration memory may be kept activated and may continue to consume power.

Also, even where a distributed configuration memory that is distributed to respective processing units is used, a mode selection signal of the CGA driving the respective processing units of the CGA may be used as a chip selection signal of the distributed operation configuration memory 140. Thus, even where configuration information does not need to be transferred from the distributed configuration memory to the FUs, the distributed configuration memory may be kept activated and may continue to consume power.

As stated above and illustrated in FIG. 1, the distributed configuration memory according to an exemplary embodiment may be separated into the distributed operation configuration memory 140 and the distributed routing configuration memory 150.

The distributed operation configuration memory 140 includes configuration information about an operation of the FU 120. The distributed operation configuration memory 140 may include execution instruction information of the FU 120, source operand information, and information about a destination receiving the result of the operation. The distributed operation configuration memory 140 may receive a predicate signal, and may be activated in response to an operation of the FU 120. As an example, the distributed operation configuration memory 140 may be activated only when an operation of the FU 120 is needed.

For example, when a no-operation (NOP) instruction to perform no operation is executed, or the predicate signal is "0," it is unnecessary to read configuration information from the configuration memory to the FU 120.

The predicate signal may indicate whether the result of an operation performed by each FU of the reconfigurable processor should be reflected in a destination, that is, a predetermined storage unit. Accordingly, the destination may be various storage units which may store a state of a program such as a register file, an output register of the FU, an input register of another FU, and a data memory. FIG. 1 illustrates an exemplary case in which a result of an operation performed by each FU is reflected in a register file. However, embodiments are not limited to this case but can be implemented in various ways. For example, the predicate signal may indicate in which storage, for example, a register or a memory, the operation result of an FU will be reflected.

The predicate signal may include a value of 1 or 0. The value can be obtained from a variety of sources such as a result calculated by another FU, and an output of the distributed routing configuration memory 150. However, sources of the predicate signal are not limited to these examples.

As an example in which the predicate signal is a result calculated by another FU, FU B outputs 1 when the result of a comparison operation is true, and outputs 0 when the result is false. Accordingly, the output may be used as an input to the predicate signal of FU A. As another example in which the predicate signal is output from the distributed routing configuration memory 150, it may be previously determined in the distributed routing configuration memory 150 that "1" or "0" is applied to the predicate signal at the corresponding cycle. The value of the predicate signal may be determined during a run time as in the former case, or fixed in advance at a static time as in the latter case.

In response to the FU 120 performing an operation, the predicate signal may be set to 1. Also, in response to the NOP being performed, a CGA scheduler (not illustrated) which schedules an instruction to be executed in the CGA does not select a predicate signal, and thus the predicate signal becomes "0." Thus, the predicate signal is also "0" when the FU 120 performs NOP. Accordingly, when NOP is performed, the distributed operation configuration memory 140 can be deactivated by using the predicate signal as a chip selection signal of the distributed operation configuration memory 140.

FIG. 1 illustrates a case in which a storage unit is a register file, and a predicate signal of "1" indicates that the result of an operation performed by an FU should be recorded in the register file. A predicate signal of "0" indicates that the result of an operation performed by an FU does not need to be recorded in the register file, such as when the operation is not meaningful.

Meanwhile, the distributed routing configuration memory 150 includes configuration information corresponding to a routing operation. For example, the distributed routing configuration memory 150 may include MUX selection information used to perform routing regarding data signal transmission of the CGA. The MUX selection information may be used to select one of a plurality of input information pieces.

In the distributed routing configuration memory 150, a signal selecting a CGA mode may be used as a chip selection signal to switch the distributed routing configuration memory 150. In other words, a signal selecting the CGA mode is input to the distributed routing configuration memory 150 as a chip selection signal to switch the distributed routing configuration memory 150, and the distributed routing configuration memory 150 continues to operate regardless of the predicate signal.

The REG 110 synchronizes a first input, which is configuration information read from the distributed operation configuration memory 140 according to the predicate signal and input to the FU 120, with a second input, which is the predicate signal input to the FU 120. In response to one clock cycle being used during a read request (for example, an address signal to read an instruction of the distributed operation configuration memory 140) corresponding to the distributed operation configuration memory 140, and another clock cycle being used to read and transfer configuration information (for example, the instruction stored in the address) according to the read request to the FU 120, the REG 110 which requires one clock cycle to synchronize the first input with the second input may be utilized.

Where one clock cycle or less is used during a read request to the distributed operation configuration memory 140 and to read and transfer configuration information according to the read request to the FU 120, the REG 110 may not be included. Also, the number of clock cycles taken by the REG 110 may vary according to a configuration of the processing unit.

The MUX 130 routes an output of the FU 120. For convenience, only one MUX 130 is illustrated in FIG. 1, but a plurality of MUXs may be used to transfer signals between processing units and between components of the processing unit.

The register file 160 is a set of one or more registers, and temporarily stores data used by the FU 120 or the result of an operation performed by the FU 120. As illustrated in FIG. 1, the register file 160 may have a plurality of input ports and store data input through the input ports. A write-enable signal, a data signal, and an address signal (not illustrated) indicating an address at which the data will be recorded may be input to the respective input ports of the register file 160.

Also, an operation result value output from the FU 120 according to the predicate signal may be stored in the register file 160. Only where the write-enable signal is "1," may an input data value be reflected in the register file 160. Thus, in the processing unit according to an exemplary embodiment, the write-enable signal of "1" may be applied to the register file 160 such that the operation result of the FU 120 is stored in the register file 160 where the predicate signal is "1."

FIGS. 2 through 5 illustrate an exemplary operation of a processing unit according to a predicate signal input to a reconfigurable processor.

In FIGS. 2 through 5, a number "0" in parentheses indicates that a signal is not applied, and a number "1" indicates that a signal is applied. An operation of FIGS. 2 through 5 is on the assumption that one clock cycle is taken to receive a read request signal from the distributed operation configuration memory 140, and another clock cycle is taken to transfer configuration information read by the distributed operation configuration memory 140 to the FU 120 and perform an operation according to the transferred configuration information.

Figure 2:
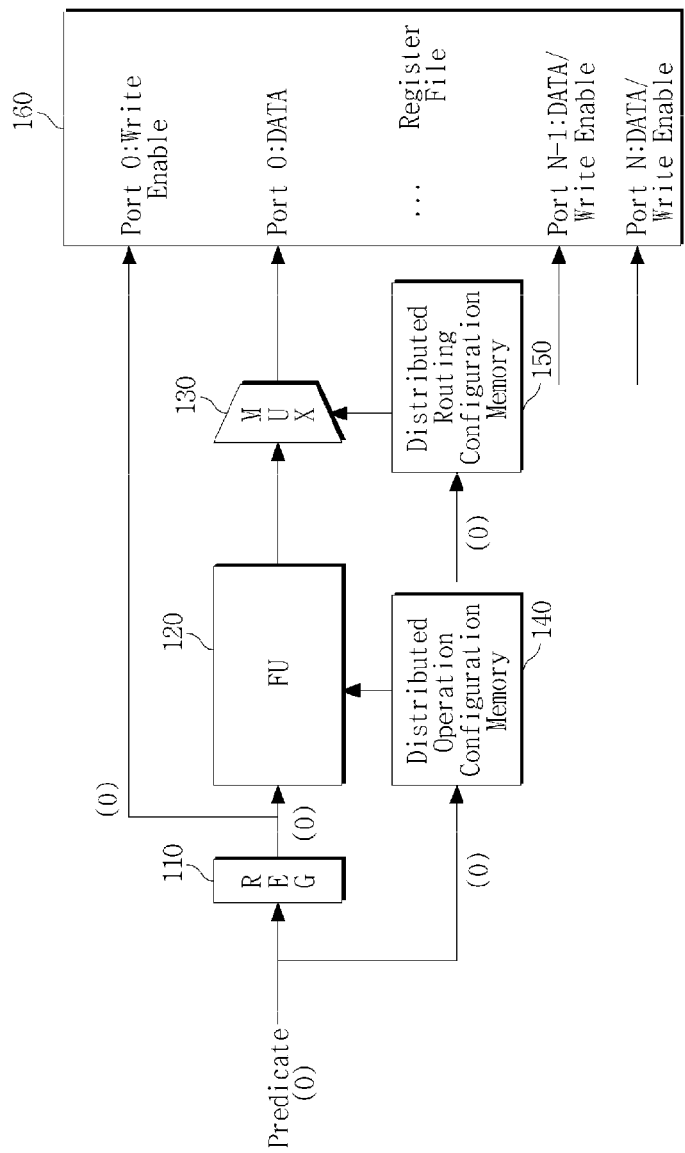
FIGS. 2 through 5 are block diagrams illustrating an exemplary operation of a processing unit according to a predicate signal input to a reconfigurable processor.

FIG. 2 illustrates a case in which the CGA does not operate because the CGA mode is not selected. In this case, the predicate signal has a value of 0, and the distributed operation configuration memory 140 and the distributed routing configuration memory 150 are both deactivated. Since a CGA mode selection signal is used as a chip selection signal of the distributed routing configuration memory 150, the distributed routing configuration memory 150 continues to operate in the CGA mode.

Figure 3:
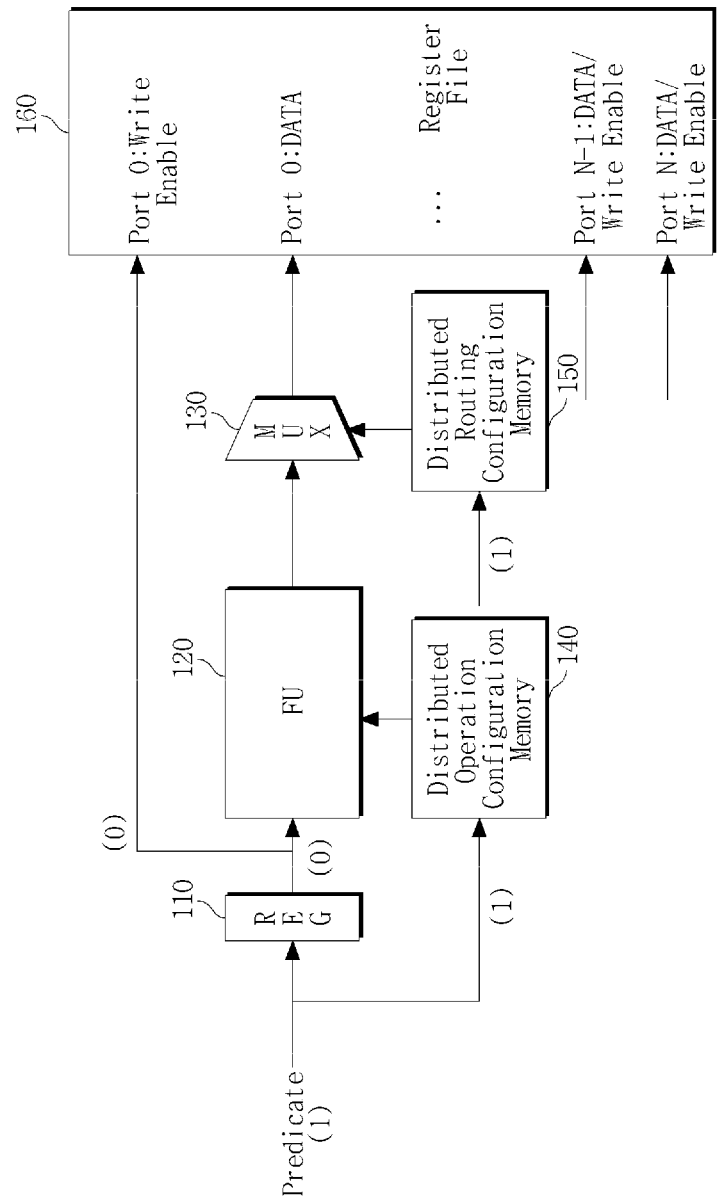

In FIG. 3, the predicate signal has a value of 1, and thus an instruction to be executed by the FU 120 at a next clock cycle is read from the distributed operation configuration memory 140. Accordingly, configuration information is input from the distributed operation configuration memory 140 to the FU 120 at a clock cycle at which the predicate signal value of 1 is input to the FU 120 through the REG 110. The result of an operation performed by the FU 120 according to the configuration information is stored in the register file 160 through the MUX 130.

Figure 4:
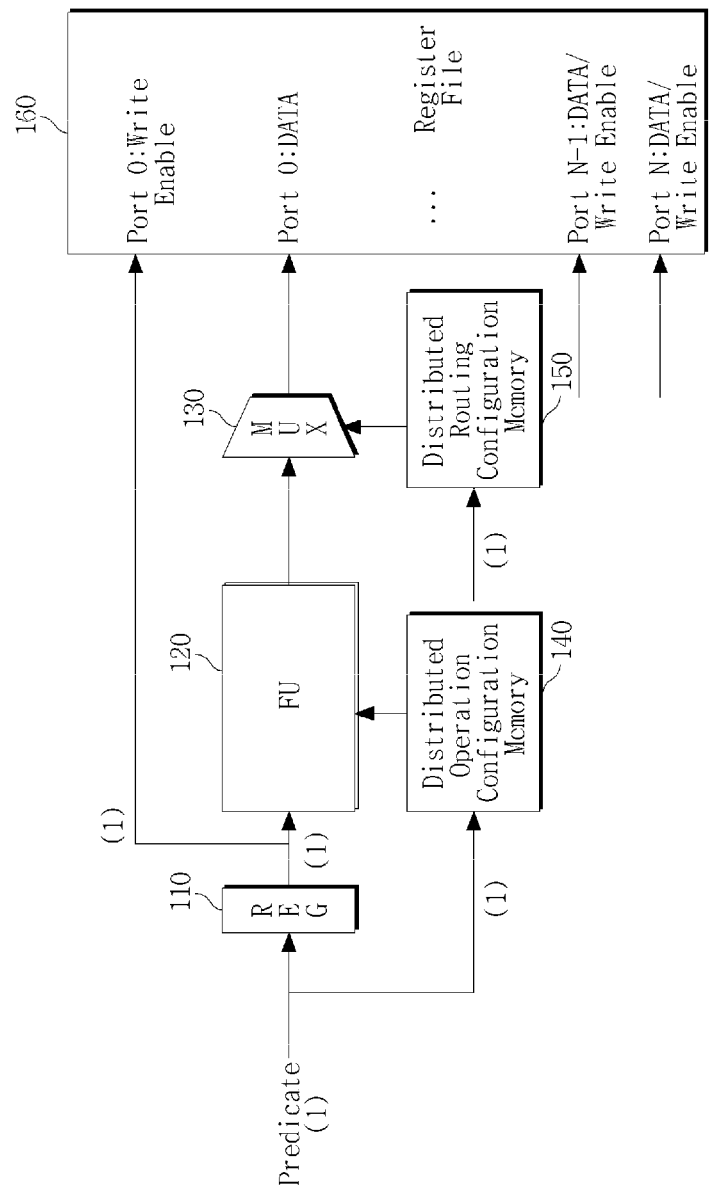

FIG. 4 illustrates a case in which the value of a predicate signal is 1 at a previous clock cycle, and the value of a currently-input predicate signal is also 1. In this case, an instruction is input from the distributed operation configuration memory 140 to the FU 120 by the previous predicate signal, and the distributed routing configuration memory 150 also operates.

Figure 5:
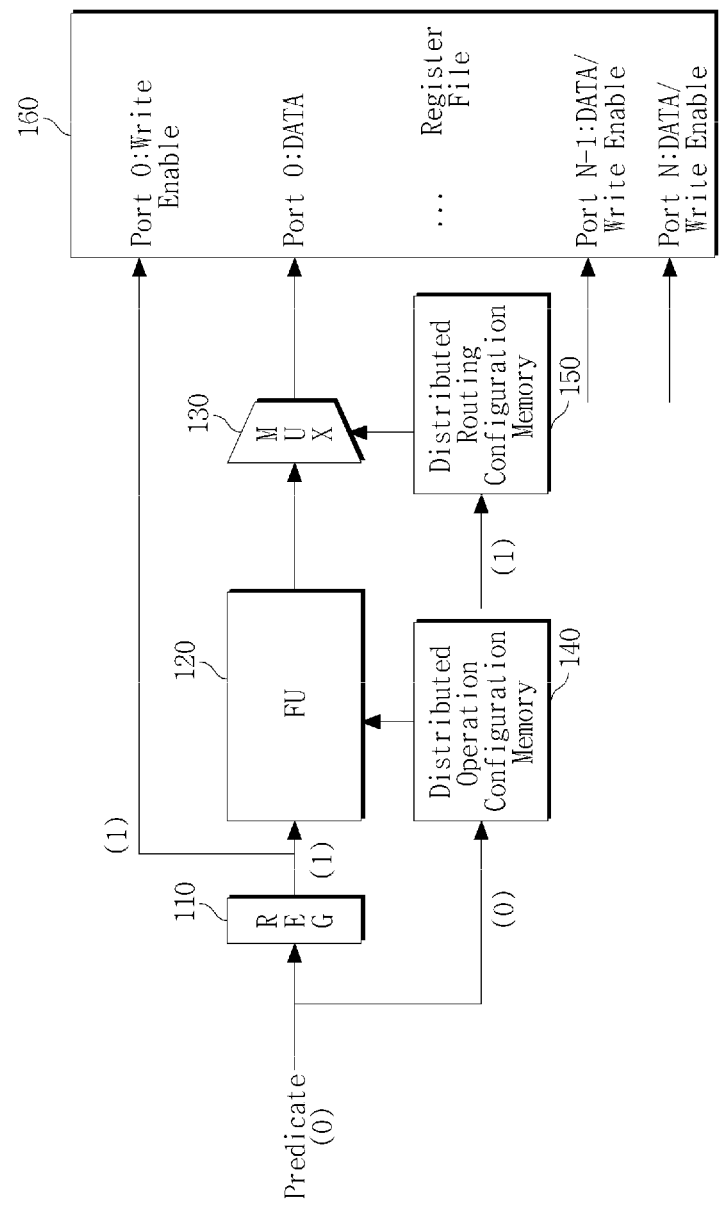

FIG. 5 illustrates a case in which the value of the predicate signal is changed from 1 to 0. Since the value of a previous predicate signal is 1, the FU 120 performs an operation according to configuration information received from the distributed operation configuration memory 140. The predicate signal value of 0 is input at the current cycle, and the distributed operation configuration memory 140 is deactivated at a clock cycle at which the predicate signal value of 0 is transferred to the FU 120.

Figure 6:
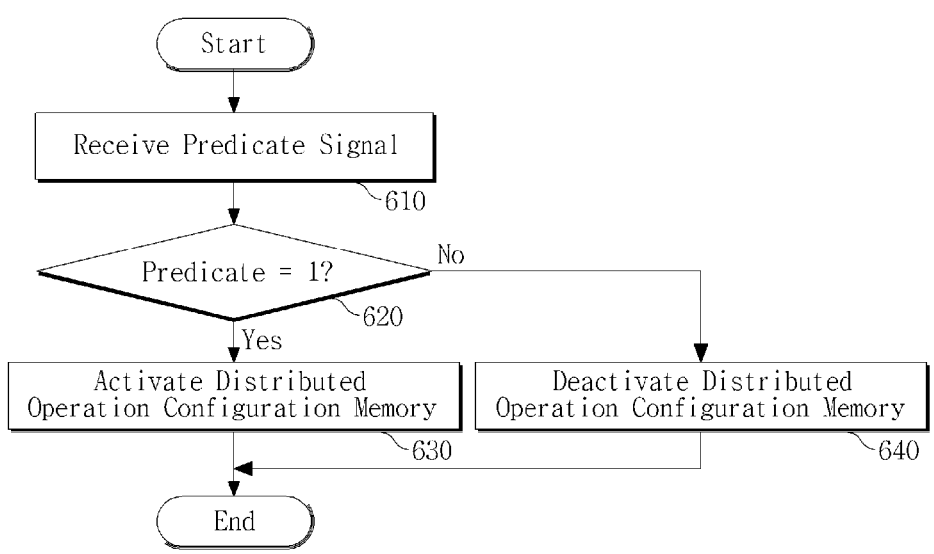
FIG. 6 is a flowchart illustrating an exemplary operation of a reconfigurable processor.

FIG. 6 is a flowchart illustrating an operation of a reconfigurable processor according to an exemplary embodiment.

FIG. 6 illustrates an operation of a reconfigurable processor including an FU to execute the above-described operation function, a storage unit to store the result of the operation, a distributed operation configuration memory including configuration information about the operation and a distributed routing configuration memory including configuration information about routing.

In operation 610, a predicate signal is received. The predicate signal may indicate whether the result of an operation performed by the FU will be stored in the storage unit.

In operation 620, it is determined whether the predicate signal has a first value, for example, 1, directing the storage unit to store the operation result of the FU.

Where it is determined in operation 620 that the value of the predicate signal is 1, the distributed operation configuration memory is activated in operation 630. For example, the distributed operation configuration memory may be activated at a clock cycle at which the predicate signal arrives at the FU.

Where it is determined in operation 620 that the value of the predicate signal is 0, the distributed operation configuration memory is deactivated in operation 640. In other words, where the predicate signal does not have the first value, the distributed operation configuration memory may be deactivated at a clock cycle at which the predicate signal arrives at the FU. A signal selecting the CGA mode is input to the distributed routing configuration memory as a selection signal which switches the distributed routing configuration memory, and the distributed routing configuration memory continues to operate regardless of the predicate signal.

According to example(s) described above, in a reconfigurable processor using a distributed configuration memory structure, a distributed configuration memory may be separated into a distributed operation configuration memory and a distributed routing configuration memory, and the distributed operation configuration memory may be activated only where necessary. Thus, it is possible to efficiently reduce power consumption without adding a compiler function or complex hardware device. Reduction of power consumption may be improved where the predicate signal is "0," or where an operation with a high NOP ratio is performed, such as where a loop with a small instruction per cycle (IPC) value is performed in the CGA.

According to example(s) described above, a processing unit included in a reconfigurable processor may reduce power consumption.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor, comprising:
   a function unit configured to perform an operation based on an input predicate signal and operation configuration information about the operation;
   a storage unit configured to store a result of the operation;
   a multiplexer configured to perform a routing operation to transfer the result of the operation to the storage unit based on routing configuration information;
   a distributed operation configuration memory configured to
      store the operation configuration information, and
      transfer the operation configuration information to the function unit based on the input predicate signal; and
   a distributed routing configuration memory configured to
      store the routing configuration information, and
      transfer the routing configuration information to the multiplexer independent of the input predicate signal.

2. The reconfigurable processor of claim 1, wherein:
   the operation configuration information comprises execution instruction information of the function unit, source operand information, and information about a destination receiving the result of the operation; and
   the routing configuration information comprises multiplexer selection information used to perform the routing operation.

3. The reconfigurable processor of claim 1, further comprising:
   a register configured to synchronize the operation configuration information transferred from the distributed operation configuration memory to the function unit based on the input predicate signal, with the input predicate signal input to the function unit.

4. The reconfigurable processor of claim 1, wherein the input predicate signal indicates whether the result of the operation will be stored in the storage unit.

5. The reconfigurable processor of claim 1, wherein:
   the storage unit comprises a register file present in each function unit; and
   the input predicate signal indicates whether the result of the operation will be stored in the register file.

6. An operating method of a reconfigurable processor, the operating method comprising:
   storing operation configuration information about an operation;
   transferring the operation configuration information based on an input predicate signal;
   performing the operation based on the input predicate signal and the operation configuration information;
   storing routing configuration information about a routing operation;
   transferring the routing configuration information independent of the input predicate signal;
   performing a routing operation to transfer a result of the operation to a storage unit based on the routing configuration information; and
   storing the result of the operation in the storage unit.

7. The operating method of claim 6, wherein:
   the operation configuration information comprises execution instruction information of the performing of the operation, source operand information, information about a destination receiving the result of the operation; and
   the routing configuration information comprises multiplexer selection information used to perform the routing operation.

8. The operating method of claim 6, further comprising:
   in response to the input predicate signal comprising a first value directing the storage unit to store the result of the operation, transferring the operation configuration information at a clock cycle at which the input predicate signal arrives for the performing of the operation; and
   in response to the input predicate signal not comprising the first value, deactivating the transferring of the operation configuration information at the clock cycle at which the input predicate signal arrives for the performing of the operation.

9. The operating method of claim 6, further comprising:
   transferring the routing configuration information based on an input signal selecting a coarse grained array (CGA) mode.

10. The operating method of claim 6, wherein the input predicate signal indicates whether the result of the operation will be stored in the storage unit.

11. The operating method of claim 6, wherein:
    the storage unit comprises a register file present in each function unit; and
    the input predicate signal indicates whether the result of the operation will be stored in the register file.

* * * * *